Nov. 8, 1949  R. J. SCHROEDER  2,487,073
AIR DUCT MOISTURE RELIEF VALVE
Filed Aug. 17, 1945
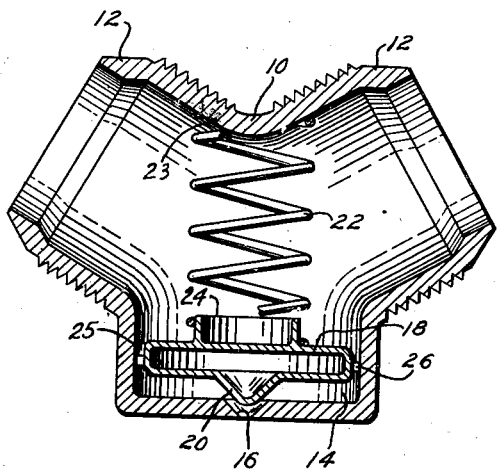
INVENTOR.
R. J SCHROEDER
BY
and
Frederick W. Cotterman
Attys Patented Nov. 8, 1949

2,487,073

UNITED STATES PATENT OFFICE 2,487,073

AIR DUCT MOISTURE RELIEF VALVE

Robert J. Schroeder, New Bremen, Ohio

Application August 17, 1945, Serial No. 611,214

1 Claim. (Cl. 137—103)

(Granted under the act of March 3, 1883, as amended April 30, 1928; 370 O. G. 757)

The invention described herein may be manufactured and used by or for the Government for governmental purposes without payment to me of any royalty thereon.

This invention relates to drain valves having particular reference to a valve for automatically draining accumulated moisture from compressed air systems such as are used in pressurizing the cabins of aircraft.

In cabin pressurization and air conditioning systems for aircraft, a pressure source in the form of an air compressor is currently used to provide air to the cabin at the desired pressure level. The heat of compression at the air compressor, or an auxiliary heat transfer means provides sufficient heat for the cabin heating at low ambient temperatures.

Due to the high speeds being obtained in contemporary aircraft at low altitudes with resultant conversion to heat of the kinetic energy of air entering the airplane for cabin ventilation, it is necessary to provide cabin cooling at high ambient temperatures.

Cabin inlet air is usually cooled by compressing the inlet air to a higher pressure than is necessary for cabin pressurization, then cooling the air insofar as possible at an intercooler, and then expanding the air across an air turbine with turbine discharge air entering the cabin. Energy may be removed from the air by utilizing the power developed at the air turbine to drive any suitable device. Thus the air enters the cabin at lower than ambient temperature.

Under conditions of high ambient humidity, the air, until it enters the air turbine, is always at higher than ambient temperature, and hence retains a constant specific humidity. However, during expansion at the turbine, the air in cooling passes the "dew" point whereupon condensation of moisture occurs. The moisture is expelled from the turbine in the form of fine mist and is carried into the air duct leading to the cabin. Some of the entrained moisture is carried to the cabin air inlet and enters the cabin where free evaporation easily occurs, but some quantity of moisture gathers at the periphery of the duct and travels with the air stream to the lowest point in the duct where it forms a pool.

It is therefore an object of this invention to prevent possible stoppage of air flow due to excess trapped moisture or entrance of quantities of water into the cabin, by providing a water trap and a relief valve and incorporating them into the cabin air duct.

Another object is to provide a relief valve of this character which will be pressuretight so as not to permit leakage of pressurized cabin inlet air under low ambient pressure conditions, while at the same time providing an exit for condensed moisture which gathers at the low point in the cabin airline.

I attain these objects and other meritorius features in the valve structure herein described, reference being had to the drawing wherein the single figure is a longitudinal vertical section through a valve constructed in accordance with my invention.

Referring now to the drawing, a valve body 10 includes pipe connections 12 either of which may be the inlet, the other being discharge side, and a sump 14 at the bottom. The pipe connections 12 may preferably be about 120° apart, thereby making the sump the lowest point in the system. A water discharge port is provided in the bottom of the sump in the form of a valve seat 16. Additional means, not shown, may be provided at the discharge port 16 for connection to a water discharge tube if so desired.

A float 18 of slightly smaller diameter than the inside of the sump carries a valve portion 20. Float 18 may preferably be evacuated or filled with some kind of a gas and sealed. The float is urged downward to seat in the discharge port by differential pressure which exists across the port when air under pressure enters the duct and also by a light spring 22 which insures proper seating of the valve during periods of inoperation of the cabin pressurization system.

A guide boss 23 on the valve body and a guide ring 24 atop the float insure proper spring alignment. The annular area 25 between the float and the valve body is maintained by lugs 26 and is sufficient to permit condensed moisture in the duct to enter the sump.

The relation of the buoyancy of the float to the force exerted on the float due to differential pressure across the water discharge orifice is such that when the sump water rises to a certain level the float valve 20 rises from the seat 16, permitting the water under the then existing differential pressure to pass through the port 16.

When the water level in the sump has receded sufficiently the float valve again seats. By this process the water in the sump is prevented from exceeding a predetermined level. It will be obvious that the valve combines the functions of permitting the escape of excess moisture in the line while at the same time preventing leakage of air under pressure.

Having described an embodiment of my invention, I claim:

For accumulating and discharging moisture condensation in an air duct, a valve which comprises a valve body of Y-shaped cross section, the three branches of the Y being hollow, of substantially equal diameter and spaced substantially one hundred twenty degrees apart, the two upwardly extending branches of the Y being open at the outer end and externally threaded for making connections between adjoining parts of said duct, and the downwardly extending branch being closed at the lower end to provide a sump, said sump having a small valve seat centrally positioned in the bottom, a float centrally positioned in said sump, a valve part carried on the bottom of said float positioned for engagement with said seat and a spring having the upper end reacting against the inside of said body and the lower end engaging said float to thereby urge said valve part to the closed position.

ROBERT J. SCHROEDER.

REFERENCES CITED

The following references are of record in the file of this patent:

UNITED STATES PATENTS

| Number | Name | Date |
| --- | --- | --- |
| 381,150 | Lowden | Apr. 17, 1888 |
| 446,014 | Popp | Feb. 10, 1891 |
| 853,345 | Duncan | May 14, 1907 |
| 1,335,602 | Pradairol | Mar. 30, 1920 |
| 2,446,334 | Koehler | Aug. 3, 1948 |

FOREIGN PATENTS

| Number | Country | Date |
| --- | --- | --- |
| 179,553 | Switzerland | Nov. 16, 1935 |